(12) United States Patent
Berger

(10) Patent No.: US 11,155,422 B2
(45) Date of Patent: Oct. 26, 2021

(54) PRODUCT TRANSFER DEVICE

(71) Applicant: SIDEL ENGINEERING & CONVEYING SOLUTIONS, Reichstett (FR)

(72) Inventor: Julien Berger, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 16/474,047

(22) PCT Filed: Dec. 22, 2017

(86) PCT No.: PCT/FR2017/053840
§ 371 (c)(1),
(2) Date: Jun. 26, 2019

(87) PCT Pub. No.: WO2018/122524
PCT Pub. Date: Jul. 5, 2018

(65) Prior Publication Data
US 2019/0322465 A1 Oct. 24, 2019

(30) Foreign Application Priority Data
Dec. 27, 2016 (FR) ........................................ 1663414

(51) Int. Cl.
*B65G 47/71* (2006.01)
*B65G 47/51* (2006.01)
(Continued)

(52) U.S. Cl.
CPC ......... *B65G 47/715* (2013.01); *B65G 47/082* (2013.01); *B65G 47/5109* (2013.01);
(Continued)

(58) Field of Classification Search
CPC .. B65G 47/5109; B65G 47/82; B65G 47/715; B65G 47/082; B65G 47/084;
(Continued)

(56) References Cited

U.S. PATENT DOCUMENTS 1,906,786 A * 5/1933 Bowman ................. C03B 35/10
198/429
2,217,982 A * 10/1940 Heil ........................ B65G 47/82
198/430

(Continued)

FOREIGN PATENT DOCUMENTS

FR 2820730 A1 8/2002
WO 2014076390 A1 5/2014

OTHER PUBLICATIONS

"Patent Translate FR2820730" EPO and Google (Year: 2020).*
International Search Report dated Apr. 3, 2018 for PCT/FR2017/053840.

*Primary Examiner* — Mark A Deuble

(57) ABSTRACT

The present invention relates to a method for transferring products (1) between a main conveyor (2) which is configured to convey products in a longitudinal direction and an accumulation surface (3) using an intermediate conveyor (4) and a pushing means (5). The method comprises acceleration of the intermediate conveyor (4) and transfer of products (1) between the intermediate conveyor (4) and the main conveyor (2) via the action of the pushing means (5), and deceleration of the intermediate conveyor (4) and transfer of products (1) between the intermediate conveyor (4) and the accumulation surface (3). The present invention also relates to a device for transferring products (1) between a main conveyor (2) which is configured to convey products in a longitudinal direction and an accumulation surface (3), enabling in particular the method according to the invention to be carried out.

16 Claims, 1 Drawing Sheet

(51) Int. Cl.
*B65G 47/82* (2006.01)
*B65G 47/68* (2006.01)
*B65G 47/08* (2006.01)

(52) U.S. Cl.
CPC ........... *B65G 47/682* (2013.01); *B65G 47/82* (2013.01); *B65G 2201/0244* (2013.01)

(58) Field of Classification Search
CPC .... B65G 47/086; B65G 47/088; B65G 47/68; B65G 47/682; B65G 2201/0244
USPC ................................................. 198/429–430
See application file for complete search history.

(56) References Cited

U.S. PATENT DOCUMENTS

| | | | | |
|---|---|---|---|---|
| 3,040,867 A * | 6/1962 | Posten | .................... | C03B 35/10 198/430 |
| 3,776,342 A * | 12/1973 | Kulig | .................. | B65G 47/904 198/430 |
| 4,768,642 A * | 9/1988 | Hunter | ................. | B65G 47/082 198/419.2 |
| 5,893,449 A * | 4/1999 | Leidy | ...................... | C03B 35/06 198/430 |
| 5,950,799 A * | 9/1999 | Peltier | ....................... | C03B 9/41 198/430 |
| 6,296,103 B1 * | 10/2001 | Gross | .................. | B26D 7/0675 198/429 |
| 10,442,635 B2 * | 10/2019 | Gehin | ................... | B65G 47/69 |
| 2015/0291367 A1 * | 10/2015 | Petrovic | ............ | B65G 47/5113 198/347.1 |

* cited by examiner

PRODUCT TRANSFER DEVICE

FIELD OF INVENTION

The present invention relates to the field of conveying products within an industrial processing line. It relates more specifically to a device for transferring products, which is capable of transferring products between a conveyor and an accumulation surface.

BACKGROUND OF THE INVENTION

Document U.S. Pat. No. 4,610,347 sets out a device for transferring products from an input conveyor to an accumulation surface in order to then form product loads. This device requires a complementary batch separation means in order to be able to transversely push a batch before the arrival of the first product of the following batch.

Document GB2174667 sets out a device for transferring products from an input conveyor to an accumulation surface in the form of a wide transverse conveyor, passing via a fixed sliding surface. The transfer to the accumulation surface is carried out by means of thrust, using a plate following the longitudinal movement of the products on the input conveyor in order to reduce the risks of products falling. Nonetheless, the risk of falling is still significant when passing over the fixed sliding portion.

SUMMARY OF THE INVENTION

An object of the present invention is to at least partially overcome these disadvantages and proposes to this end interposing, between the accumulation surface and the main conveyor, an intermediate conveyor which can then be slowed to a speed which is sufficiently low for the products to be transferred transversely without any risk of falling from or toward the accumulation surface and which can then be accelerated to a speed which is sufficiently close to that of the main conveyor so that the transfer to or from the main conveyor is also carried out without any risk of falling. Such a solution enables an additional downstream batch separation means to be avoided and therefore enables a significant saving of space.

The present invention thus proposes a method for transferring products between a main conveyor which is configured to convey products in a longitudinal direction and an accumulation surface, characterized in that it is carried out using an intermediate conveyor and a pushing means, and in that it comprises the following steps:
  acceleration of the intermediate conveyor,
  transfer of products between the intermediate conveyor and the main conveyor via the action of the pushing means,
  deceleration of the intermediate conveyor,
  transfer of products between the intermediate conveyor and the accumulation surface.

As a result of these arrangements, the transfer of products can be carried out continuously between a main conveyor which operates at a constant speed and a fixed accumulation surface in the movement direction of the conveyor with a reduced risk of products falling, the transfer steps being carried out between two surfaces whose longitudinal speed relative to each other is substantially zero. The need to create spaces between batches is thus avoided, using another means, upstream on a main input conveyor. The creation of unnecessary spaces between batches on a main output conveyor is also avoided in the corresponding configurations.

According to other features:
  the transfer of products between the intermediate conveyor and the accumulation surface can be carried out using the pushing means, this enabling the device implementing the method according to the invention to be simplified,
  the pushing means may comprise a pushing wall which can be moved longitudinally and which is configured to be able to follow the longitudinal movement of the products during the transfer steps, which, as a result of following the longitudinal movement of the products, enables the column to be prevented from being retained upstream for the time of the passage of the pushing wall or, conversely, prevents the products from being thrown transversely with an excessively rapid pushing means,
  the method being able to further comprise the following steps, some steps being able to be carried out at least partially at the same time as others:
    longitudinal acceleration of the pushing wall before transferring products between the two conveyors so that the pushing wall reaches a movement which has the speed and the circulation direction of the main conveyor;
    longitudinal deceleration of the pushing wall before transferring products between the intermediate conveyor and the accumulation surface so that the pushing wall stops in the longitudinal direction for a lowest possible relative longitudinal speed between the intermediate conveyor and the accumulation surface.
  In this manner, during the transfer between the main and intermediate conveyors, the pushing means is engaged only with the products which it is transferring and does not disturb the products upstream and/or downstream which are present on the main conveyor. Furthermore, during the transfer steps, the relative longitudinal speed between the products and the pushing means is substantially zero so that the stability of the products is improved and the risk of falling reduced. The pushing wall and the intermediate conveyor therefore circulate longitudinally for a time at the same speed as the main conveyor, then slow down substantially until stopped so that the products are transferred transversely on the accumulation surface with a relative longitudinal speed of zero or practically zero,
  the method according to the invention may further comprise the following steps:
    lifting the pushing means until it is above the products, transverse return of the pushing means and longitudinal return of the pushing wall,
    lowering the pushing means,
  in this manner, the pushing means returns into position in order to transfer the following batch of products without disturbing the products present on the main conveyor, and a new transfer cycle can begin. The return is also more rapid and less extensive than if the return has to be carried out in the horizontal plane.

The invention also relates to a device for transferring products between a main conveyor which is configured to convey products in a longitudinal direction and an accumulation surface, the device comprising the main conveyor, the accumulation surface and a pushing means, characterized in that it comprises an intermediate conveyor, arranged between the main conveyor and the accumulation surface and adjacent to and in alignment with the main conveyor in order to enable a transfer of products by transverse displacement of the pushing means between the main conveyor and the intermediate conveyor, and in that the intermediate conveyor has a separate drive means relative to the main conveyor in order to be able to vary the speed of the intermediate conveyor independently of that of the main conveyor.

As a result of these arrangements, the transfer of products can be carried out continuously between a main conveyor which operates at a constant speed and a fixed accumulation surface with a reduced risk of products falling, the transfer steps being carried out between two surfaces whose speed relative to each other is substantially zero.

According to other features:
the pushing means may comprise a pushing wall,
the pushing wall may be movable longitudinally, thus during the transfer between the main and intermediate conveyors, the pushing means may be in engagement only with the products which it transfers and may not disturb the products upstream and/or downstream which are present on the main conveyor, furthermore, during the transfer steps, the relative longitudinal speed between the products and the pushing means may be substantially zero so that the stability of the products is improved and the risk of falling reduced,
the pushing means may further comprise a retention wall, this simple device enabling the pushing means to be associated with a wall which is located downstream of the products in the direction in which they are pushed, and therefore enabling the risk of products falling during their transfer and the risk of loss of longitudinal alignment to be limited,
the retention wall may be movable longitudinally and the stability of the products is further improved and, furthermore, the retention wall may be fixedly joined to the pushing wall which simplifies the device,
the product transfer device may comprise a secondary pushing means which is configured to push the products between the intermediate conveyor and the accumulation surface, and the pushing means may transfer the products only between the main and intermediate conveyors, which enables more rapid transfer cycles to be carried out,
the pushing means may be configured to push the products, on the one hand, between the main conveyor and the intermediate conveyor, on the other hand, between the intermediate conveyor and the accumulation surface, which enables the invention to be produced with a minimum of movable components, and therefore a limited cost,
the pushing means may comprise a lifting mechanism which is configured to enable it to pass above the products, and the pushing means can return into position in order to transfer the next batch of products without disturbing the products present on the main conveyor and while preventing a long return cycle in a horizontal plane, and a new transfer cycle can begin.

The present invention further relates to an accumulation system which comprises a main input conveyor, a main output conveyor and an accumulation surface which is arranged between these two conveyors. This system is specific according to the invention in that it comprises an intermediate input conveyor and/or an intermediate output conveyor and at least an input pushing means and an output pushing means, which are configured in accordance with any one of the embodiments listed above.

BRIEF DESCRIPTION OF THE DRAWINGS

The present invention will be better understood from a reading of the following detailed description.

DETAILED DESCRIPTION

Figure 1:
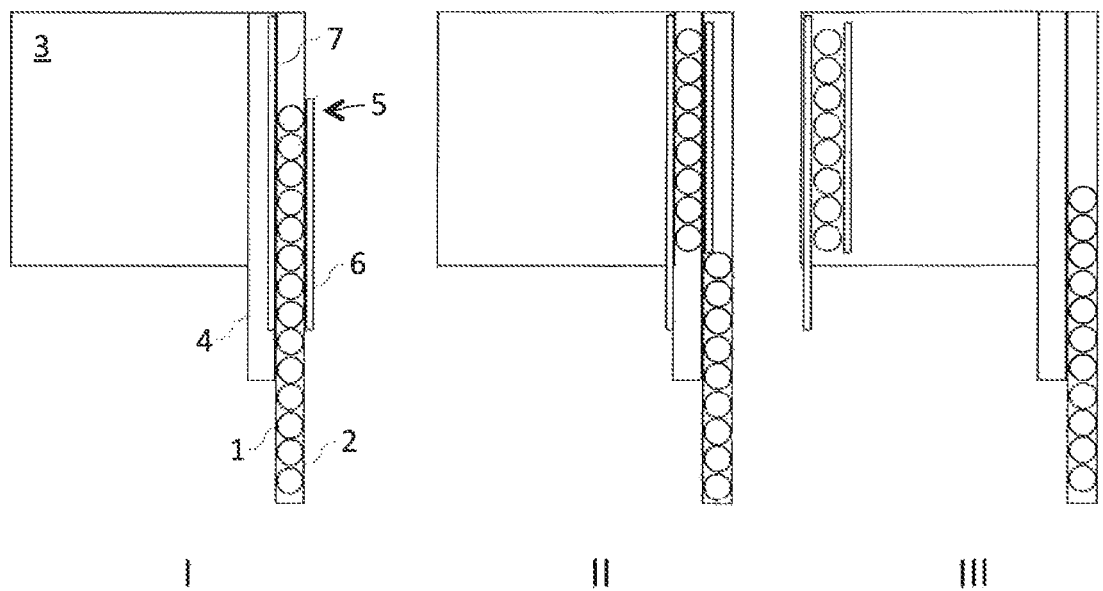
FIG. 1 is a schematic sequential view of a method according to a first embodiment of the invention.

The transfer device according to the invention, illustrated in FIG. 1, enables products 1 to be transferred between a main conveyor 2 and an accumulation surface 3 via an intermediate conveyor 4. The main conveyor 2 and the intermediate conveyor 4 each have their own drive means, which enables independent operation, in particular at different speeds. The main conveyor 2 may, for example, operate at a speed which is constant or at least adjusted by the requirements of the machine to which it is connected, whilst the intermediate conveyor 4 may operate at a variable speed, typically between a zero speed and the speed of the main conveyor 2.

In order to better understand the movements, the directions X, Y and Z will be named in the following manner: the direction X represents the longitudinal advance direction of the products 1 on the main conveyor 2, the direction Y represents the horizontal direction perpendicular to X and the direction Z represents the vertical direction.

The main conveyor 2 and the intermediate conveyor 4 are arranged adjacent to each other, conveying the products 1 in accordance with X. Furthermore, when products 1 are transferred between the main conveyor 2 and intermediate conveyor 4, the two conveyors 2, 4 operate substantially at the same speed. The transfers are carried out in accordance with Y using a pushing means 5.

It is possible to make provision for the pushing means 5 to be fixed longitudinally. It is necessary to provide a sufficiently rapid pushing of the products 1, in particular at the beginning of the pushing movement. This is because the pushing means 5 engages on a longitudinal batch of products 1 on the main conveyor 2, and it has to push this longitudinal batch toward the intermediate conveyor 4. During the pushing movement, the first product 1 not to be engaged by the pushing means 5 follows its path on the main conveyor 2 and has to be pushed during the following cycle. It is thus important that this product 1 does not strike the pushing means 5; it has to be sufficiently rapid to escape it. For example, the pushing means 5 may begin its acceleration before engaging the following products 1 in order to engage them at an initial speed which is not equal to zero.

According to a preferred embodiment of the invention, during the transfer of the products 1 between the conveyors 2 and 4, the pushing means 5 can move longitudinally in accordance with X at the same speed as the conveyors 2, 4. The relative speed between the products 1 and the pushing means 5 is thus substantially zero, which enables the products 1 not to be disturbed upstream and/or downstream of the assembly of products 1 being transferred, whilst beginning the pushing movement at an initial transverse speed of substantially zero. This has in particular the advantage of better stability of the products 1 during the pushing action.

The intermediate conveyor 4 and the accumulation surface 3 are arranged adjacent to each other. In other words, the intermediate conveyor 4 extends along an edge of the accumulation surface 3. Furthermore, during the transfer of products 1 in accordance with Y between the intermediate conveyor 4 and the accumulation surface 3, the intermediate conveyor 4 operates at zero speed or almost zero after a deceleration. The transfers between the intermediate conveyor 4 and the accumulation surface 3 are carried out by a transfer means which may be the pushing means 5, which follows its path in accordance with Y, or another transfer means which takes over.

Figure 2:
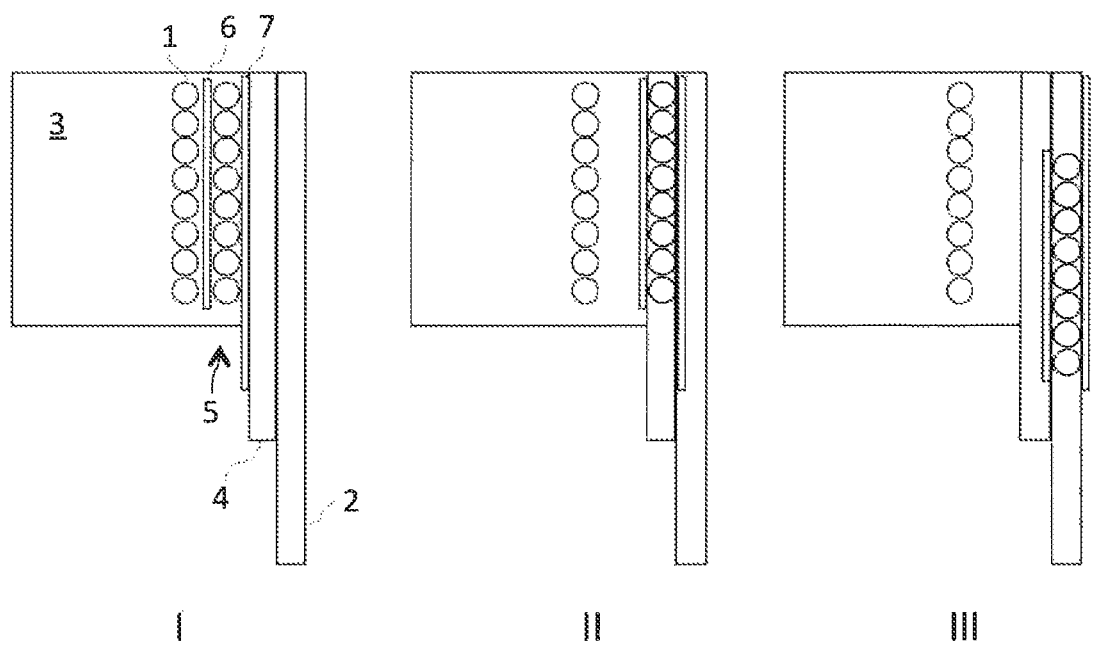
FIG. 2 is a schematic sequential view of a method according to a second embodiment of the invention.

In order to transfer products 1 between a main conveyor 2 and an accumulation surface 3, the device according to the invention can be implemented according to a transfer method comprising the following steps:

acceleration of the intermediate conveyor 4 up to a speed close or even equal to the speed of the main conveyor 2 (step 1, FIG. 1 and step III FIG. 2) and transfer of the products 1 between the two conveyors 2, 4 via the action of the pushing means 5 which moves longitudinally in accordance with X at the speed of the intermediate conveyor 4 (step II, FIG. 1 and step III, FIG. 2), deceleration of the intermediate conveyor 4 (step II, FIG. 1 and step I, FIG. 2), where applicable up to stoppage, and transfer of the products 1 between the intermediate conveyor 4 and the accumulation surface 3 (step III, FIG. 1 and step II, FIG. 2).

This method is repeated in a cyclical manner.

The steps of changing speed of the intermediate conveyor 4, whether it be accelerations or decelerations, are carried out with acceleration values which are sufficiently low to limit the risk of falling, or longitudinal sliding which would result in loss of the longitudinal positioning, of the products 1. The acceleration values are further sufficiently high for the transfer method not to be excessively long and for the transfer device not to take up too much space. It is possible to provide in particular higher acceleration or deceleration values when the intermediate conveyor 4 is empty and lower values when it is loaded with products 1.

The transfer method follows a cycle during which successive batches of products 1 are transferred. Preferably, a batch of products 1 is transferred in accordance with Y between the main conveyor 2 and the accumulation surface 3 before the transfer method of the following batch of products is initiated. This enables only one and the same pushing means 5 to be used in the transfer device according to the invention and therefore avoids additional costs.

The method according to the invention can be used in order to transfer products from a main conveyor 2 to an intermediate conveyor 4, then from the intermediate conveyor 4 to an accumulation surface 3, as illustrated in FIG. 1. After having been removed, for example, from an upstream machine, the products 1 are arranged on the main conveyor 2, for example, in the form of a single row. The main conveyor 2 operates at a substantially constant speed, which may correspond to the output speed of an upstream machine. The method according to the invention thus comprises the following steps:

arrival of a row of products 1 on the input conveyor 2,
acceleration of the pushing means 5 and the intermediate conveyor 4, where applicable at the same time, for example, up to a speed close or even equal to the speed of the input conveyor 2,
transfer of the products 1 from the input conveyor 2 to the intermediate conveyor 4, via the action of the pushing means 5,
slowing of the intermediate conveyor 4, for example, to a speed of almost zero or even zero,
transfer of the products 1 from the intermediate conveyor 4 to the accumulation surface 3 via the action of the pushing means 5 or another complementary pushing means, preferably as far as a predetermined location, in particular against the products which are already present on the accumulation surface, or directly to the opposite edge. The products 1, stored on the accumulation surface 3, may remain there for some time or leave immediately toward a downstream machine.

These steps may be repeated several times in a cyclical manner, creating each time a batch and transferring it to the accumulation surface 3.

The transfers in accordance with Y of the products 1 from the main conveyor 2 to the intermediate conveyor 4, then from the intermediate conveyor 4 to the accumulation surface 3, may be carried out using a single pushing means 5. When the products 1 are transferred to the accumulation surface 3, the pushing means 5 carries out a return into position in order to transfer the following batch of products 1, at the other side of the main conveyor 2. This return can be carried out integrally in a horizontal plane, for example, if the pushing means 5 is sufficiently movable longitudinally, such as, for example, using a longitudinal drive belt. In another embodiment, the return may involve a vertical displacement in order to pass above the products 1.

The method according to the invention can also be used to transfer products 1 from an accumulation surface 3 to a main conveyor 2, as illustrated in FIG. 2.

After having been stored on the accumulation surface 3 for a shorter or longer time, it is desirable for the products 1 to be moved, for example, to a downstream machine. The method according to the invention thus comprises the following steps:

presence of products 1 on the accumulation surface 2 in the form of longitudinal batches one against the other in a transverse direction,
longitudinal deceleration of the intermediate conveyor 4 and if necessary of the pushing means 5, for example, to a speed of zero or almost zero,
transfer of the products 1 from the accumulation surface 2 to the intermediate conveyor 4, at a longitudinal speed of zero or almost zero,
acceleration of the intermediate conveyor 4 and if necessary of the pushing means 5, for example, to a speed close or equal to the speed of the main conveyor 2,
transfer of the products 1 from the intermediate conveyor 4 to the main conveyor 2.

These steps may be repeated several times in a cyclical manner, transferring each time a batch from the accumulation surface 3 to the main conveyor 2.

In some embodiments, such as that illustrated in FIGS. 1 and 2, the pushing means 5 comprises a pushing wall 6, arranged in order to push the products 1, and a retention wall 7 which is arranged at the other side of the products 1 in order to prevent the products 1 from falling forward during the pushing action, and to ensure the longitudinal alignment of the products 1. According to a specific embodiment, only the pushing wall 6 can be moved longitudinally during the transfer cycle, the retention wall 7 remaining fixed in position in accordance with X during this transfer. It may involve a plate 6 which can be moved longitudinally relative to the pushing means 5 in a back-and-forth movement in a frame which the pushing means 5 comprises.

The spacing between the pushing wall 6 and the retention wall 7 may be able to be controlled in order to adjust to the size of the products.

The retention wall 7 may extend from a frame of the pushing means 5, this frame being mounted on a transverse sliding member. An actuator of the electric motor type enables movements of the pushing means 5 to be produced in accordance with Y, for example, via a belt.

The transverse sliding member is itself fixed to a frame which is mounted on a vertical sliding member. An actuator of the electric motor type enables vertical movements to be produced in accordance with Z of the pushing means 5, for example, via a belt.

The frame of the pushing means 5 may comprise a plate which may be fixed to a carriage which can be moved longitudinally along a longitudinal sliding member and actuated by a belt which is connected to a motor which is arranged on the frame.

Each of the motors may function in the two directions in order to enable a back-and-forth movement, and can be associated with a frequency variator, which enables the movement speed of the plate to be varied.

In other embodiments, the pushing means 5 may comprise only a pushing wall 6 and may not have a retention wall 7.

It would also be possible to make provision for the complete pushing means 5 comprising the pushing wall 6 and optionally the retention wall 7 to be able to be moved longitudinally.

The main conveyor 2, for example, as an input conveyor, operates at a speed which is controlled by an upstream machine. The products 1 transported by the main conveyor 2 are placed one behind the other with no spacing, and then removed in the form of longitudinal batches of products one against the other, the batches being placed one beside the other transversely.

The device according to the invention enables the products 1 to be transferred from the main conveyor 2 without it being necessary to create beforehand batches which are separated from each other by a space, as is generally the case in the solutions of the prior art.

By means of suitable adjustment of the starting time of the pushing movement, acceleration and maximum speed of each of the longitudinal and transverse movements, it is possible to achieve a transfer of a batch of products 1 without striking a product 1 of the following batch and a return of the pushing means 5 in time for the transfer of the following batch under the same conditions.

The pushing means 5 can be moved transversely in accordance with Y in order to carry out the pushing action. It is possible to provide an acceleration value of this movement, a maximum speed and a deceleration value. It is possible to provide a lower deceleration value than the acceleration value in order to prevent products 1 from following their transverse path alone and from leading to an offset batch of products, particularly if the pushing means 5 does not comprise a retention wall 7. This is because they are slowed transversely by the friction on the conveyor 2, 4 or the accumulation surface 3, and the pushing means 5 therefore preferably does not have to slow down more significantly than the slowing produced by this friction.

The pushing means 5, once the pushing action has been carried out, must then return into a position which enables it to search for the following batch of products 1, and to transfer it to the accumulation surface. It has to do this without striking the products 1, which it must push transversely in accordance with Y during the following cycle. It is possible to imagine a longitudinal movement in accordance with X which is sufficiently rapid and extensive to achieve this objective, displacing the pushing means 5 in accordance with X until passing beyond all the products 1 at least of the following batch. This can be carried out more easily when the pushing means 5 comprises only a single pushing wall 6 without the retention wall 7, which would also require a movement passing beyond all the products 1 of the batch which has just been pushed.

More simply, it is possible to make provision for the pushing means 5 to carry out a vertical movement in accordance with Z by a value which is greater than the height of the products 1 in order to pass above the products 1 when it has to find the following batch of products 1 on the accumulation surface 2 and to insert the pushing wall between two successive batches of products 1 in accordance with the axis Y. The acceleration and deceleration values of these vertical movements in accordance with Z will be determined only in accordance with the mechanical movements carried out, the pushing means 5 not interacting with the products 1 during these movements.

Finally, the pushing means 5, or only the pushing wall 6, may be moved with a longitudinal movement in order to accompany the movement of the products 1 and to enable a zero relative speed between the pushing wall 6 and the products 1.

A longitudinal speed difference of zero or at least less than one or a few tenths of a meter per second between the intermediate conveyor 4 and the main conveyor 2, on the one hand, and with the accumulation surface 3, on the other hand, for the respective corresponding transfers will in particular be able to be considered to be sufficiently low to significantly reduce the risk of products 1 falling as a result of this difference.

The transfer device according to the invention may be integrated in an accumulation system. Such an accumulation system may be placed between an upstream machine and a downstream machine, and enables a buffer reserve of products 1 to be created so that in the event of unavailability or slowing of the speed of the downstream machine, for example, the upstream machine can continue to function at a normal speed, and that, in the event of stoppage of the upstream machine, the downstream machine can continue to be supplied. The accumulation system comprises an accumulation surface 3, a main input conveyor and a main output conveyor. The transfer device according to the invention, comprising in particular an intermediate conveyor 4 with variable speed, can then be used either in order to carry out the transfer of products 1 between the main input conveyor and the accumulation surface or in order to carry out the transfer of products 1 between the accumulation surface 3 and the main output conveyor, or to carry out the two types of transfers.

Although the above description is based on specific embodiments, it is by no means limiting for the scope of the invention and modifications can be carried out, in particular by substituting equivalent techniques or by means of a different combination of all or some of the features set out above.

The invention claimed is:

1. A method for transferring products (1) between a main conveyor (2) which is configured to convey products in a longitudinal direction and an accumulation surface (3) using an intermediate conveyor (4) arranged between and in alignment with the accumulation surface (3) and the main conveyor (2), and a pushing device (5), the method comprising:

acceleration of the intermediate conveyor (4) to a speed approximate to a speed of the main conveyor (2), transfer of products (1) from the main conveyor (2) to the intermediate conveyor (4) via the action of the pushing device (5), deceleration of the intermediate conveyor (4) to a speed approximately zero, and transfer of products (1) from the intermediate conveyor (4) directly to the accumulation surface (3), wherein the accumulation surface (3), at its transfer location, is configured to be movable, and wherein the pushing device (5) comprises a pushing wall (6) movable longitudinally relative to the products (1) received from the main conveyor (2).

2. The method as claimed in claim 1, wherein the transfer of products (1) between the intermediate conveyor (4) and the accumulation surface (3) is carried out using the pushing device (5).

3. The method as claimed in claim 2, wherein the pushing device (5) is configured to follow the longitudinal movement of the products during the transfer steps.

4. The method as claimed in claim 1, wherein the pushing device (5) is configured to follow the longitudinal movement of the products during the transfer steps.

5. The method as claimed in claim 4, further comprising:
longitudinal acceleration of the pushing wall (6) before transferring products (1) between the two conveyors (2, 4), and
longitudinal deceleration of the pushing wall (6) before transferring products (1) between the intermediate conveyor (4) and the accumulation surface (3).

6. The method as claimed in claim 5, further comprising:
lifting the pushing device (5) above the products (1),
transverse return of the pushing device (5) and longitudinal return of the pushing wall (6), and
lowering the pushing device (5).

7. The device for transferring products (1) as claimed in claim 1, wherein the pushing device (5) further comprises a retention wall (7).

8. The device for transferring products (1) as claimed in claim 1, wherein the pushing device (5) is configured to push the products (1) between the intermediate conveyor (4) and the accumulation surface (3).

9. The device for transferring products (1) as claimed in claim 1, wherein the pushing device (5) is configured to push the products, on the one hand, between the main conveyor (2) and the intermediate conveyor (4), on the other hand, between the intermediate conveyor (4) and the accumulation surface (3).

10. The device for transferring products (1) as claimed in claim 1, wherein the pushing device (5) comprises a lifting mechanism which is configured to enable it the pushing device (5) to pass above the products (1).

11. A device for transferring products comprising:
a main conveyor (2) configured to convey products in a longitudinal direction,
an accumulation surface (3) for receiving products (1) from the main conveyor (2), and
a pushing device (5), comprising an intermediate conveyor (4), arranged between the main conveyor (2) and the accumulation surface (3) and adjacent to and in alignment with the main conveyor (2) in order to enable a transfer of products (1) directly to the accumulation surface (3) by transverse displacement of the pushing device (5) between the main conveyor (2) and the intermediate conveyor (4),
wherein:
the accumulation surface (3), at its transfer location, is configured to be movable,
the intermediate conveyor (4) has a separate drive means relative to the main conveyor (2) in order to be able to vary the speed of the intermediate conveyor (4) independently of that of the main conveyor (2),
the pushing device (5) comprises a pushing wall (6) and a retention wall (7), each movable longitudinally relative to the products (1) received from the main conveyor (2), and
the pushing device (5) is configured to be vertically displaced in order to pass above the products (1).

12. The device for transferring products (1) as claimed in claim 11, wherein the pushing device (5) further comprises a retention wall (7).

13. The device for transferring products (1) as claimed in claim 12, wherein the retention wall (7) can be moved longitudinally.

14. The device for transferring products (1) as claimed in claim 11, wherein the pushing device (5) is configured to push the products (1) between the intermediate conveyor (4) and the accumulation surface (3).

15. The device for transferring products (1) as claimed in claim 11, wherein the pushing device (5) is configured to push the products, on the one hand, between the main conveyor (2) and the intermediate conveyor (4), on the other hand, between the intermediate conveyor (4) and the accumulation surface (3).

16. The device for transferring products (1) as claimed in claim 11, wherein the pushing device (5) comprises a lifting mechanism which is configured to enable it the pushing device (5) to pass above the products (1).

\* \* \* \* \*